US011210624B1

(12) United States Patent
Wang et al.

(10) Patent No.: US 11,210,624 B1
(45) Date of Patent: Dec. 28, 2021

(54) METHOD AND SYSTEM FOR DETERMINING QUANTITY PREDICTIONS

(71) Applicant: Amazon Technologies, Inc., Seattle, WA (US)

(72) Inventors: Siyuan Wang, New York, NY (US); Nikhil Bhardwaj, Aberdeen, NJ (US); Tanvir Talukder, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 16/134,361

(22) Filed: Sep. 18, 2018

(51) Int. Cl.
*G06Q 10/08* (2012.01)
*G06N 20/00* (2019.01)
*G06N 5/02* (2006.01)

(52) U.S. Cl.
CPC .......... *G06Q 10/083* (2013.01); *G06N 5/022* (2013.01); *G06N 20/00* (2019.01)

(58) Field of Classification Search
CPC ....... G06Q 10/083; G06N 20/00; G06N 5/022
USPC ....................................................... 705/330
See application file for complete search history.

(56) References Cited

U.S. PATENT DOCUMENTS

| | | | | |
|---|---|---|---|---|
| 8,473,425 | B1* | 6/2013 | Maurer | G06Q 10/083 705/336 |
| 10,579,955 | B1* | 3/2020 | Wier | G06Q 10/0838 |
| 10,636,079 | B2* | 4/2020 | Shiely | G06Q 30/0639 |
| 2004/0249699 | A1* | 12/2004 | Laurent | G06Q 10/02 705/37 |
| 2014/0188747 | A1* | 7/2014 | D'Urso | G06Q 10/083 705/330 |
| 2019/0311301 | A1* | 10/2019 | Pyati | G06F 16/901 |

OTHER PUBLICATIONS

Singliar, Tomas; "Demand Forecasting for Shipping and Distribution"; Jun. 26, 2017 (Year: 2017).*

* cited by examiner

*Primary Examiner* — George Chen
*Assistant Examiner* — Dione N. Simpson
(74) *Attorney, Agent, or Firm* — Knobbe Martens Olson & Bear, LLP

(57) ABSTRACT

Generally described, one or more aspects of the present application correspond to machine learning techniques for generating predictions about how much of an item will sell to certain destination regions at certain shipping speeds. A machine learning model, such as a neural network, can be trained to make such predictions based on historical data. The predictions can be presented in a user interface that enables sellers to evaluate the predicted sales and opt in to supporting particular shipping speeds to particular destinations, for example enabling the sellers to create offers for the items with terms corresponding to desired shipping speeds and destinations.

20 Claims, 5 Drawing Sheets

METHOD AND SYSTEM FOR DETERMINING QUANTITY PREDICTIONS

BACKGROUND

When a user places an order with an e-commerce system, the system typically provides multiple shipping options, such as ground shipping, two day shipping, overnight shipping, shipping to specific known addresses, etc. In some cases, the system might provide a delivery window or range including many dates that merchandise might be delivered. Multiple shipping options can be presented to the user for selection, based for instance on shipping window, cost, and other factors associated with each shipping option.

DETAILED DESCRIPTION

Figure 1A:
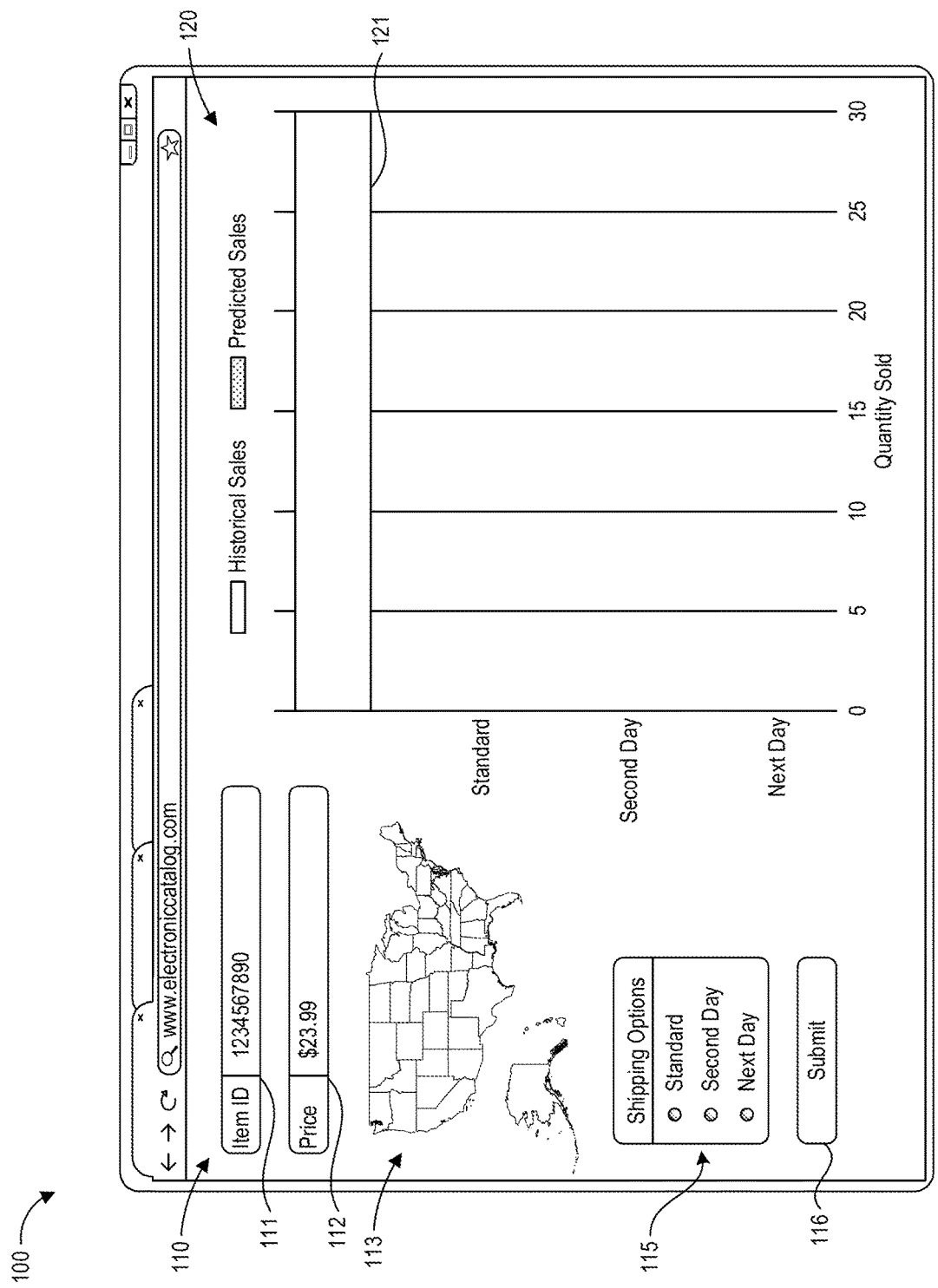
FIG. 1A depicts an example user interface for use in providing information for the disclosed shipping analysis techniques.

An electronic marketplace can enable various selling partners to list items in the marketplace, where such items include goods available for acquisition (e.g., purchase or rental) by users of the electronic catalog. Typically, a given selling partner can manually specify the shipping preferences that they will support for the items they are listing. These shipping preferences can include the destination regions to which the selling partner is willing to ship items, as well as the particular delivery speeds (e.g., same day, next business day, two day, standard, etc.) that the selling partner will support in each region. Thereafter, these shipping preferences are typically applied to all items that the selling partner lists in the electronic catalog.

This uniformity of shipping preferences across a selling partner's listings does not account for the fact that user shipping preferences can vary widely between types of items, or from region to region. For example, items that tend to be purchased as gifts may have higher demand for faster delivery speeds. Other types of items that are not typically required urgently by the purchasing user may be infrequently ordered using fast delivery speeds. With respect to varying preferences across regions, the level of urgency with which a particular item is ordered may vary from region to region. For example, insect repellant may be typically ordered with faster delivery speeds in regions that have a higher incidence of insect bites, and with slower delivery speeds in regions that are relatively free from biting insects. However, this nature of user preferences for certain delivery speeds can be difficult for an individual selling partner to ascertain based on their limited selling history. This can be particularly true for selling partners listing new types of items, or for selling partners who are not familiar with the delivery timing trends of certain regions.

The above described problems, among others, are addressed in some embodiments by the disclosed machine learning (ML) techniques for enabling selling partners to evaluate the predicted quantity of a particular item that a merchant can expect to sell, if they make that item available at certain shipping speeds and to certain destination regions. Specifically, a ML model can be trained to predict the quantity of a certain type of item that will be sold in a given region when that item is available at a given delivery speed. Items can be represented using their salient features, such that the ML model learns patterns between item features and quantity sold per region per delivery speed. This can make the ML model robust to making predictions about new items that may never have been sold in the electronic catalog. Beneficially, by learning from selling history across the entire electronic catalog, the ML model can capture trends that may not be perceptible by an individual selling partner. Further, the ML model can determine shipping-based sales at an item-level granularity.

As would be appreciated by one of skill in the art, the use of a ML shipping coach, as disclosed herein, represents a significant technological advance over prior implementations. Specifically, the ML shipping coach can enable selling partners to specify more granular shipping preferences using fewer steps, and thus, few computer actions and interactions, than previous systems. For instance, the ML shipping coach can generate specific predictions (about quantity sold per item, per shipping speed, and per region), configure a user interface to dynamically present this information to selling partners, and enable the selling partners to specify new shipping preference based on the displayed information. One user interface can enable the selling partner to view a graphical representation of their historical sales versus inventory sale predictions for various region at various shipping speeds, and to opt-in to any shipping speeds that they desire for that item. Accordingly, selling partners can make informed decisions about whether to incur the expense of supporting additional shipping options, on a per-item level of granularity rather than across their entire inventory. Because the ML shipping coach can provide user interface features that enable the selling partner to specify per-item supported shipping options in association with the inventory predictions, selling partners can more efficiently opt in to specific shipping options for each item in their inventory using the ML shipping coach user interfaces, compared to existing shipping option templates. As such, the embodiments described herein represent significant improvements in computer-related technology.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Overview of Example ML Shipping Analysis

FIG. 1A depicts an example user interface 100 for use in providing information for the disclosed shipping analysis techniques. The user interface 100 includes a user input region 110 and a prediction display region 120. It will be appreciated that these may be presented in separate user interfaces in alternate embodiments.

The user input region 110 includes a first input field 111 that enables the selling partner to identify a particular item.

As used herein, an "item" refers to a physical product that can be made available for purchase, rental, or lease, for example via an electronic catalog. As such, the disclosed techniques are able to generate predictions that are specific to a particular item. The user input region 110 also includes a second input field 112 that enables the selling partner to specify a price for the item. As such, the disclosed predictions can account for a particular price point for the item, and the selling partner can modify the price to see how their sales are predicted to change based on different prices.

The user input region 110 also includes a graphical representation of a number of different destination regions 113 to which the item can be shipped. In the illustrated example, the destination regions are represented as the states of the United States. It will be appreciated that the disclosed techniques can be used for other locations and sizes of destination regions, such as countries, counties, cities, zip codes, blocks, or streets. For example, certain consumer items may be shipped internationally, and thus the destination regions may be particular countries. As another example, food delivery may occur quite locally, and thus the destination regions may be particular cities, blocks, or streets. It will be appreciated that the graphical representation can vary, for example being a list of region names rather than a graphical depiction of region shapes.

These destination regions 113 can be selectable, such that the selling partner can select particular destination regions for which they wish to view predictions. In some implementations, the disclosed ML analysis may only occur for selected destination regions. In some implementations, the disclosed ML analysis may be performed for all available regions, and the selling partner can be presented with all prediction results or select a particular region to view the prediction for that region.

The user input region 110 also includes a listing 115 of available shipping options. These available shipping options be determined on a per-item basis, such that the displayed shipping options are all suitable for the item (e.g., shipping options suitable for fragile, large, perishable, or other specialized types of items). Like the destination regions 113, individual ones of the available shipping options may be selectable. In some implementations, the disclosed ML analysis may only occur for selected shipping options. In some implementations, the disclosed ML analysis may be performed for all available shipping options, and the user can be presented with all prediction results or select a shipping options to view the prediction for that shipping option.

Some implementations can try all possible region and shipping option combinations and recommend the ones that yield the highest predicted quantities to the selling partner. Some implementations can remove certain combinations from this analysis, for example narrowing to popular shipping speeds, or eliminating combinations that would not be used in reality (e.g., same-day shipping to distant regions). This can increase the computational efficiency of discovering optimal shipping region/destination combinations.

In some implementations, the user input region 110 can include a "submit" button 116 or other suitable user interface feature to indicate that the user has made their selections of destination regions and shipping options for which they would like to see sales predictions. Selection of this user interface feature can call computer-executable instructions for implementing the disclosed ML analysis to generate quantity predictions. In other implementations, the predictions can be generated as the selling partner makes selections from among the destination regions 113 and the shipping option listing 115. In still other implementations, all options can be analyzed and the results can be displayed to the selling partner based on their selections from among the destination regions 113 and the shipping option listing 115.

The prediction display region 120 in FIG. 1A includes information indicating a quantity of historical sales 121. This can represent actual sales (or rentals, leases, etc.) that this particular selling partner has had during some predetermined prior timeframe, such as six months, one year, or more or less. This beneficially provides the user with baseline information about their previous sales (if any) at their previously supported shipping options to previously supported destination states. In some implementations, the prediction display region 120 may be omitted until a prediction is generated and displayed.

Figure 1B:
FIG. 1B depicts an example of the user interface of FIG. 1A, updated with results of the disclosed shipping analysis.

FIG. 1B depicts an example of the user interface 100 after having been updated with results of the disclosed shipping analysis. In the illustrated implementation, the selling partner has selected a particular destination region 114 and all of the available shipping options 115. As such, the prediction display region 120 has been updated with predictions 122, 123, 124 about the quantity of the item that the selling partner is likely to sell to the selected destination region 114 at each of the available shipping options 115. This can enable the selling partner to evaluate whether the cost or investment that they may have to make to support a particular destination or shipping option would be worth the predicted sales. In addition, the user interface 100 can include user-selectable features that enable the selling partner to select certain ones of the destination regions 113 and shipping options 115 to create offers for this particular item. Each offer would make the item available from that selling partner to users in a specific destination region at a specific shipping speed (and optionally at a specific price). In FIG. 1B, this is represented as the opt-in button 117, which could create offers at each of the selected shipping options to the selected destination region 114.

Accordingly, selling partners can evaluate whether particular shipping option and destination combinations meet their requirements, and can create offers for these combinations on a per-item basis. For example, a selling partner can select the items in their inventory, use the disclosed ML shipping coach to determine what their likely sales will be at particular shipping speed and destination combinations, and opt-in to the combinations that satisfy the selling partner's criteria. This can enable the selling partner to customize and optimize their supported shipping options and destination regions using fewer steps and with a greater degree of customization than would be possible with prior implementations.

Figure 2:
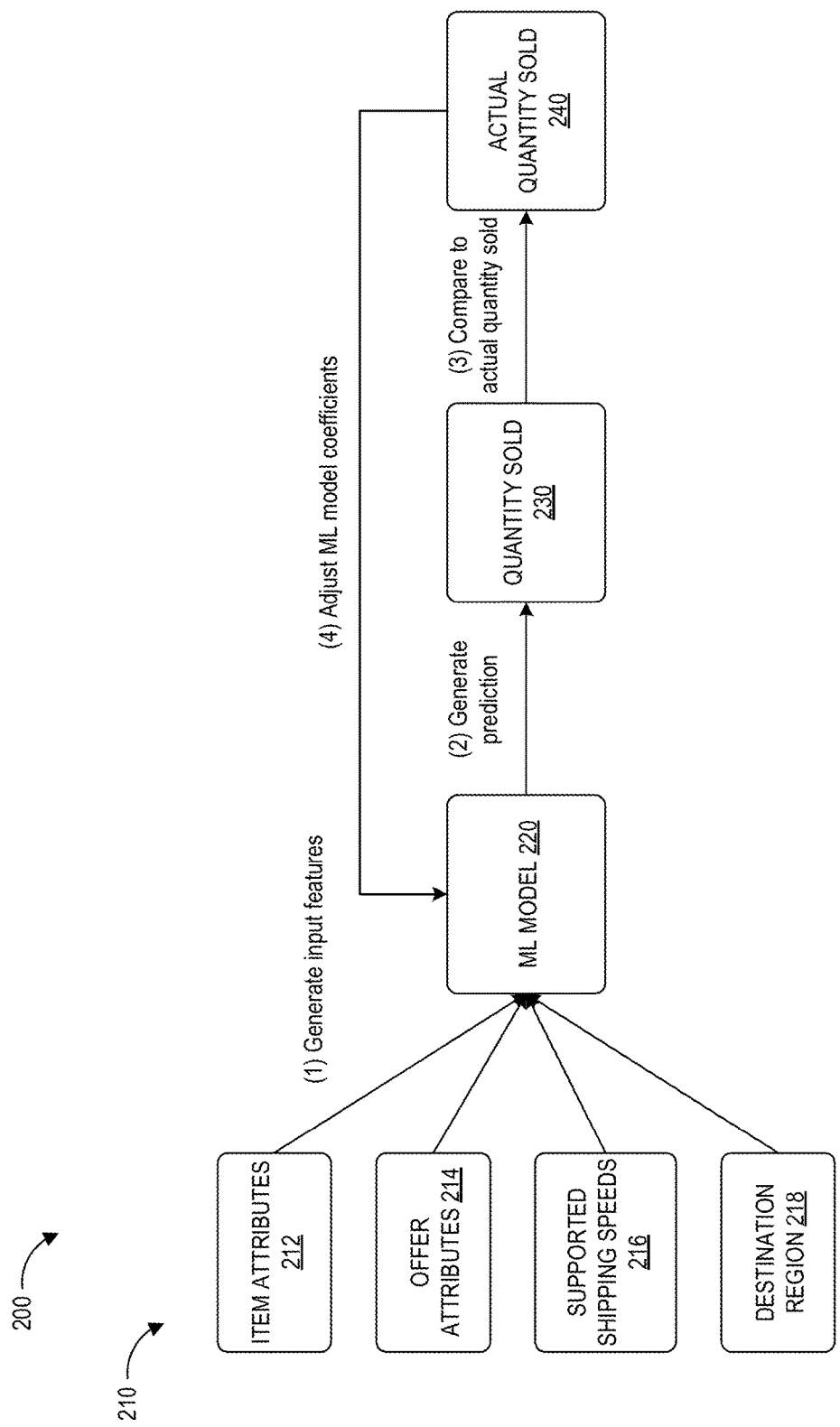
FIG. 2 depicts an example workflow for training a machine learning model to make quantity predictions, as described herein.

FIG. 2 depicts an example workflow 200 for training a ML model 220 to make quantity predictions, as described herein. The ML model 220 can be any suitable model that takes a machine-readable representation of input of offer parameters, processes the input through a set of learned parameters, and generates an output representing a predicted quantity that will be sold. The ML model 220 can be a linear regression model in some implementations. For example, the ML model 220 can implement a squared loss function trained using stochastic gradient descent to optimize its coefficients. The ML model 220 can be an artificial neural network trained using stochastic gradient descent, in some implementations. Artificial neural networks are artificial in the sense that they are computational entities, inspired by biological neural networks but modified for implementation by computing devices. Artificial neural networks are used to model complex relationships between inputs and outputs or to find patterns in data, where the dependency between the inputs and the outputs cannot be easily ascertained. A neural network typically includes an input layer, one or more intermediate ("hidden") layers, and an output layer, with each layer including a number of nodes. The number of nodes can vary between layers. A neural network is considered "deep" when it includes two or more hidden layers.

The nodes in each layer connect to some or all nodes in the subsequent layer. A fully connected neural network is one in which each node in the input layer is connected to each node in the subsequent layer (the first hidden layer), each node in that first hidden layer is connected in turn to each node in the subsequent hidden layer, and so on until each node in the final hidden layer is connected to each node in the output layer. Each node can weight and sum the inputs provided by connected nodes in a previous layer, perform an activation (e.g., ReLU, tanh, sigmoid, etc.) on the summed input, and output this activation value to connected nodes in a next layer. The weights of these connections are typically learnt from data during the training process, for example through backpropagation in which the network parameters (e.g., the connection weights) are tuned to produce expected outputs given corresponding inputs in labeled training data. Thus, an artificial neural network is an adaptive system that is configured to change its structure (e.g., the connection weights) based on information that flows through the network during training, and the weights of the hidden layers can be considered as an encoding of meaningful patterns in the data.

During training, an artificial neural network (or other suitable ML model) can be exposed to pairs in its training data and can modify its parameters to be able to predict the output of a pair when provided with the input. In FIG. 2, these data pairs include the input features 210 and the output of the actual quantity sold 240. For example, the ML model 220 can be trained on historical data representing actual sales of items at particular shipping speeds to particular destination regions. The actual quantity sold 240 can be analyzed across particular windows of time, for instance all sales that occurred during a period of six months, a year, or longer or shorter in various implementations. The length of this window of time can correspond to the length of the window of time used to determine the historical sales quantity 121 of FIGS. 1A and 1B.

The features of the input data 210 can include item attributes 212, offer attributes 214, supported shipping speeds 218, and destination region 218. Though not illustrated, certain implementations can also factor seller features (e.g., average rating, number of ratings, historical sales). For new selling partners, values of these features can be estimated in order to provide a prediction. Item attributes 212 can include one or more of category (e.g., category of a general ledger, browse tree, or other item hierarchy), dimension (e.g., the physical dimensions of the item or the item as packed for shipping, or a categorization (small, regular, bulky) of these dimensions), brand, average customer rating, rating/review count, natural language processing analysis of textual reviews, and item image features, to name a few examples. Beneficially, representing items as their features makes the ML model 220 robust to making predictions for new items that may have little or no historical sales data. Item image features may be automatically extracted, for example based on analysis from a convolutional neural network. Offer attributes 214 can include the price of the item. Supported shipping speeds 216 can indicate whether a particular shipping speed is supported for the item (e.g., via a binary 1 or 0 at various positions in a vector representing supported shipping speeds). The destination state 218 may be represented as a code or other machine-readable value.

Prior to training, the input data 210 can be pre-processed such that it is grouped by certain features (e.g., grouped by destination state 218, grouped by item attributes 212, or grouped by supported shipping speeds 216). Shipping speeds may be grouped by specific shipping options, or by minimum days until delivery. Thus, the actual quantity sold 240 can be aggregated transactions that share a unique feature or combination of features, and then the ML model 220 can be trained can be trained with these different groups. Beneficially, this can enable the ML model 220 to make predictions for different combinations of shipping speeds and destination regions, for different types of items.

At step (1) of the workflow, the input data 210 can be converted into features suitable for input into the ML model 220, for example a vector, tensor, matrix, or other machine-readable format. At step (2), this representation of the input data 210 can be forward passed through the ML model 220 to generate a prediction 230 regarding the quantity that would be sold. At step (3), this prediction 230 can be compared to the actual quantity sold 240. Based on the difference between the prediction 230 and the actual quantity 240, at step (4) the coefficients (e.g., tunable connection weights) of the ML model 220 can be adjusted to enable the ML model 220 to more accurately predict the actual quantity sold 240. This tuning can be done using stochastic gradient descent for backpropagation, and may use a regularizer to prevent overfitting on a large data set. Once trained, the model coefficients can be stored for use in making predictions using new input data.

Figure 3:
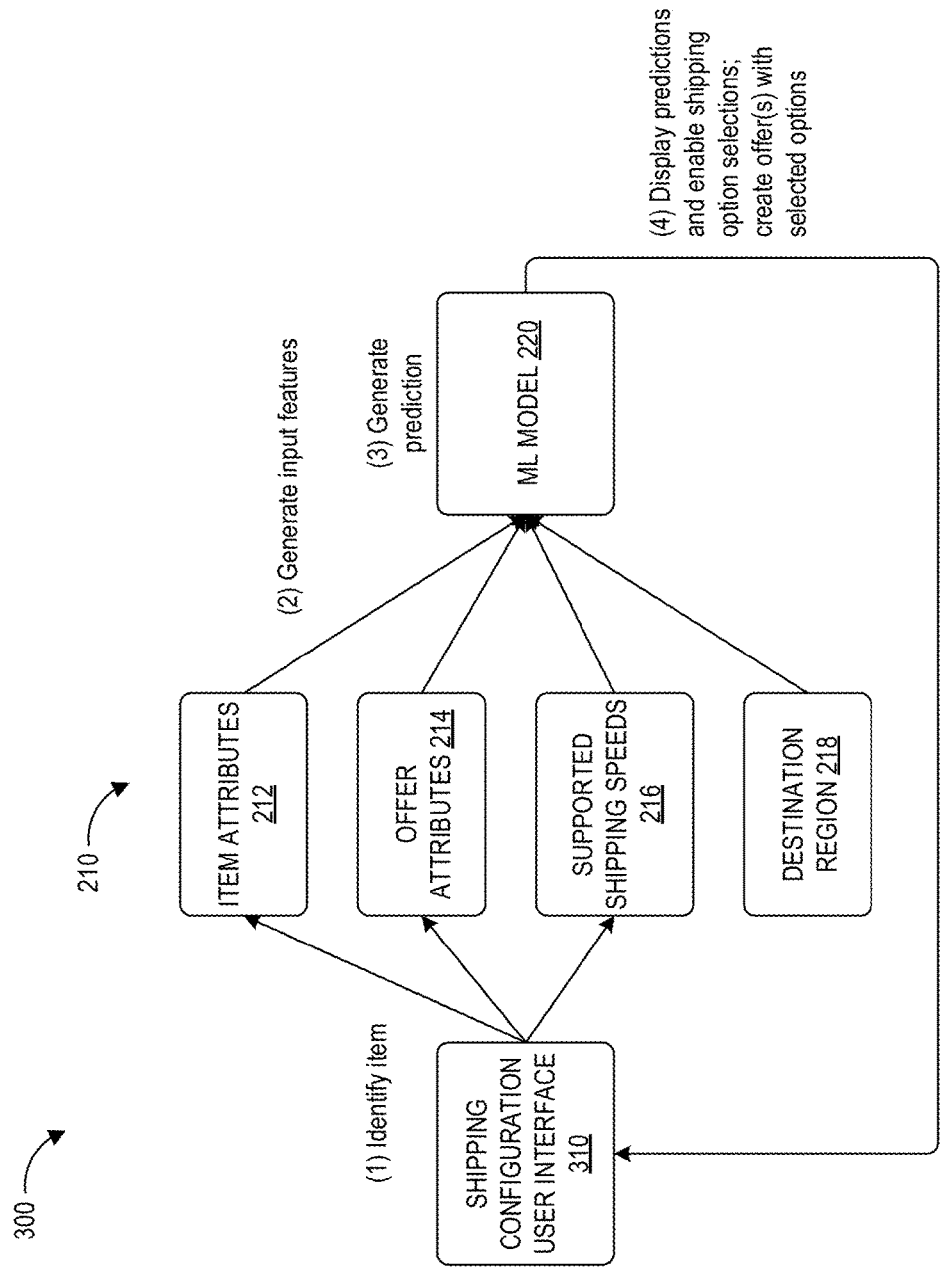
FIG. 3 depicts an example workflow for using a machine learning model trained according to FIG. 2 to make quantity predictions, as described herein.

FIG. 3 depicts an example workflow 300 for using a ML model 200 trained according to FIG. 2 to make quantity predictions, as described herein. FIG. 3 schematically depicts a shipping configuration user interface 310, which can be the user interface 100 or another suitable user interface that enables the user to test and opt-in to different destination and shipping option combinations. Using this user interface 310, at step (1) the selling partner can identify the item. At step (2), the ML system can use the item attributes 212 of this item together with other data to generate input data 210. For example, the ML system can identify offer attributes 214, supported shipping speeds 216, and destination regions 218. Separate input data 210 can be generated for each combination of these features to generate separate predictions for each combination. As described above, this can be generated in a machine-readable format. At step (3), this representation of the input data 210 can be forward passed through the ML model 220 to generate a prediction regarding the quantity that is likely to be sold. At step (4), the ML system can display the prediction and enable shipping option selections, for example via the user interface 100. In some implementations, the predictions generated for a particular selling partner may be scaled based on how many other selling partners have listings for the items, and based on the particular selling partner's participation in that segment of listings. Also at step (4), the ML system can monitor user interactions with the user interface 100 and can create offer(s) for the item with any selected options.

Execution Environment

Figure 4:
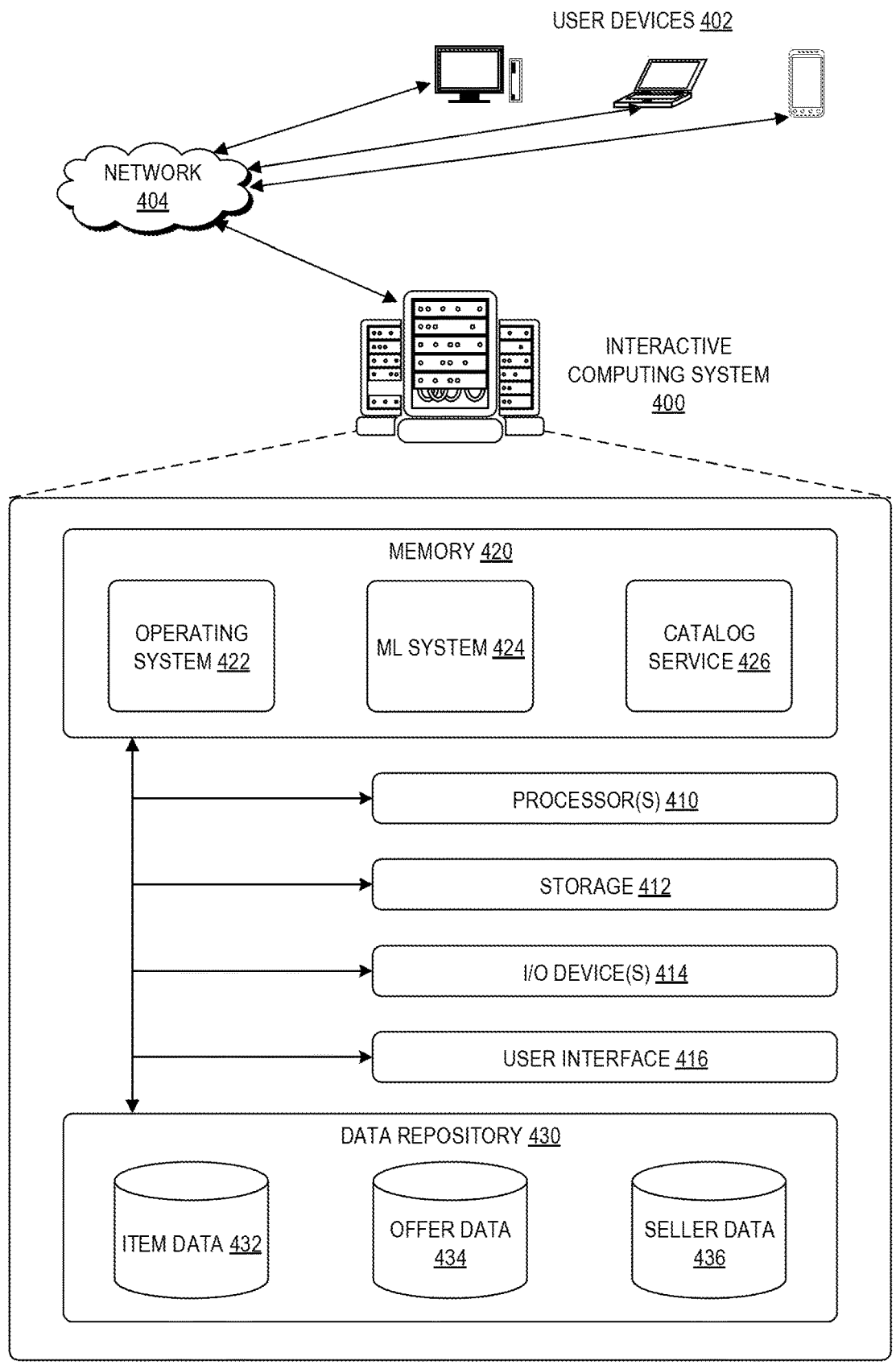
FIG. 4 illustrates a schematic block diagram of an example interactive computing environment for performing and providing the disclosed machine learning shipping analysis.

FIG. 4 is a block diagram of an illustrative computing system 400 configured to implement the processes 200, 300 to train and implement a ML shipping coach and associated user interfaces, as described herein. The architecture of the interactive computing system 400 includes a memory 420 in communication with a processor 410, which can be in direct communication with one another or distributed among computing devices within a networked computing system and in communication with each other. Components used for the architecture may depend at least in part upon the type of network and/or environment selected.

As depicted interactive computing system 400 may include one or more computers, perhaps arranged in a cluster of servers or as a server farm. The memory and processors that make up these computers may be located within one computer or distributed throughout many computers (including computers that are remote from one another) as detailed herein. These servers may be configured to intelligently display and configure multi-offer user interfaces, as described herein. For example, the interactive computing system 400 may be configured to manage user interfaces displayed in connection with an electronic marketplace.

The interactive computing system 400 may include at least one memory 420 and one or more processing units (or processor(s)) 410. The memory 420 may include more than one memory and may be distributed throughout the interactive computing system 400. The memory 420 may store program instructions that are loadable and executable on the processor(s) 410 as well as data generated during the execution of these programs. Depending on the configuration and type of memory, the memory 420 may be volatile (such as RAM and/or non-volatile (such as read-only memory ("ROM"), flash memory, or other memory). In some examples, the memory 420 may include multiple different types of memory, such as static random access memory ("SRAM"), dynamic random access memory ("DRAM"), or ROM.

The memory can store the program instructions as a number of modules that configure processor(s) 410 to perform the various functions described herein, for example operating system 422, ML system 424, and catalog service 426. The memory 420 may include operating system 422 for interacting with the interactive computing system 400. The ML system 424 can include the ML model 220, a training module configured to implement the workflow 200, and an inference module configured to implement the workflow 300.

Users can browse an electronic catalog provided by the catalog service 426 to obtain information about electronic catalog content stored in an item data repository 432. The electronic catalog content can include detailed information about these products. In one embodiment, this content is arranged in a hierarchical structure, having items associated with one or more categories or browse nodes in a hierarchy (or graph). The catalog service 426 can provide functionality for users to browse the item hierarchy in addition to searching the catalog. Users can acquire items via offers generated by the disclosed techniques. The catalog service 426 can also provide functionality for selling partners to make their item inventories available to users of the catalog service 426.

The processor 410 includes one or more general purpose computers, dedicated microprocessors, graphics processors, or other processing devices capable of communicating electronic information. Examples of the processor 410 include one or more application-specific integrated circuits ("ASICs"), for example ASICs purpose built for machine learning training and/or inference, field programmable gate arrays ("FPGAs"), digital signal processors ("DSPs") and any other suitable specific or general purpose processors. The processor 410 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 400 may also include additional storage 412, which may include removable storage and/or non-removable storage. The additional storage 412 may include, but is not limited to, magnetic storage, optical disks, and/or tape storage. The disk drives and their associated computer-readable media may provide non-volatile storage of computer-readable instructions, data structures, program modules, and other data for the computing devices. The memory 420 and the additional storage 412, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The interactive computing system 400 may also include input/output (I/O) device(s) and/or ports 414, such as for enabling connection with a keyboard, a mouse, a pen, a voice input device, a touch input device, a display, speakers, a printer, or other I/O device.

The interactive computing system 400 may also include a user interface 416. The user interface 416 may be provided over the network 404 to user devices 402 and utilized by a user to access portions of the interactive computing system 400. In some examples, the user interface 416 may include a graphical user interface, web-based applications, programmatic interfaces such as application programming interfaces ("APIs"), or other user interface configurations. The user interface 416 can be generated as described herein to provide quantity predictions and enable selling partners to opt in to selected destination and shipping option combinations.

The interactive computing system 400 may also include a data store 430. In some examples, the data store 430 may include one or more data stores, databases, data structures, or the like for storing and/or retaining information associated with the interactive computing system 400. Thus, the data store 430 may include data structures, such as an item data repository 432, offer data repository 434, and seller data repository 436.

The item data repository 432 comprises one or more physical data storage devices that stores data representing the items, including the items being considered for recommendation. In the context of the electronic catalog, item data can include names, images, brands, prices, descriptions, user reviews (textual or numerical ratings), category/subcategory within a hierarchy of browsable categories of the electronic catalog, high-level category within a general ledger of the electronic catalog, particular services or subscriptions for which the item qualifies, and any metadata associated with specific items of the catalog. The item data repository 432 also stores data representing item information, including the attributes used to generate input data for the ML techniques described herein. The catalog service 426 can access electronic catalog or other item data from item data repository 432.

The offer data repository 434 comprises one or more physical data storage devices that stores information regarding offers available for items in the catalog. This information can include the offer features set by selling partners as described herein, as well as other offer-related information. Offer features may include price, shipping speed, seller, seller quality (e.g., based on user ratings), and qualifying memberships.

The seller data repository 436 comprises one or more physical data storage devices that stores data about selling partners, for example their item inventories and the offers that the selling partners have specified for these items. The seller data repository 436 can also store data representing seller features as described above, for instance average seller rating, number of ratings, and historical sales.

The interactive computing system 400 can communicate over network 404 with user devices 402. The network 404 can include any appropriate network, including an intranet, the Internet, a cellular network, a local area network or any other such network or combination thereof. User devices 402 can include any network-equipped computing device, for example desktop computers, laptops, smartphones, tablets, e-readers, gaming consoles, and the like. Users can access the interactive computing system 400 and interact with items therein via the network 404, and selling partners can be provided with predictions as described herein via the network 404.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The disclosed processes may begin in response to an event, such as on a predetermined or dynamically determined schedule, on demand when initiated by a user or system administer, or in response to some other event. When the process is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks and modules described in connection with the embodiments disclosed herein can be implemented or performed by a machine, such as a processor device, a DSP, an ASIC, an FPGA, or other programmable logic device, discrete gate or transistor logic, discrete hardware components, or any combination thereof designed to perform the functions described herein. Moreover, the various illustrative logical blocks, modules, routines, and algorithm steps described in connection with the embodiments disclosed herein can be implemented as electronic hardware (e.g., ASICs or FPGA devices), computer software that runs on computer hardware, or combinations of both. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
   a memory storing instructions for implementing a machine learning (ML) shipping analysis; and
   one or more processors in communication with the memory, the one or more processors configured by the instructions to at least:
      receive, via a shipping configuration user interface on a user computing device, an indication of an item, a shipping option for the item, and a destination region to which the item can be shipped via the shipping option;
      identify a feature of the item;
      generate machine readable input data representing the feature of the item, the shipping option, and the destination region;
      provide the machine readable input data to a machine learning (ML) model comprising an artificial neural network, wherein the artificial neural network is:
         generated from a plurality of training data sets, wherein each training data set comprises at least (i) a quantity of the item that was acquired within a period of time, (ii) a destination region in which the item was acquired, and (iii) a shipping option used to acquire the item, and
         trained to associate, for each training data set, the quantity of the item that was acquired within the period of time, with (i) the destination region in which the item and (ii) the shipping option used to acquire the item;
      propagate the machine readable input data through the artificial neural network to generate a predicted quantity of the item that will be acquired in the destination region using the shipping option;
      cause output of updates to the shipping configuration user interface, wherein the updates include information representing the predicted quantity and a user-selectable option to create an offer for the item, wherein terms of the offer for shipments to the destination region include the shipping option; and
      in response to an expiration of a duration of a time that is same as the period of time, determine a difference between the predicted quantity and an actual quantity acquired in the destination region using the shipping option within the period of time, and update the artificial neural network based at least in part on the difference.

2. The system of claim 1, wherein the one or more processors are configured by the instructions to at least, in response to selection of the user-selectable option, update a seller shipping configuration profile to include the offer for the item.

3. The system of claim 1, wherein the shipping configuration user interface includes a map with at least one selectable destination region, and wherein the one or more processors are configured by the instructions to at least generate the machine readable input data based at least partly on user selection of the selectable destination region.

4. The system of claim 1, wherein a plurality of shipping options are available for shipping the item to a plurality of destination regions, and wherein the one or more processors are configured by the instructions to at least:
   generate, with the ML model, a plurality of predicted quantities of the item that will be acquired for at least two different combinations of one of the plurality of shipping options and one of the plurality of destination regions; and
   compare the predicted quantity of the item that will be acquired in the destination region using the shipping option with the plurality of predicted quantities to determine that the predicted quantity for the destination region and the shipping option exceeds at least one predicted quantity of the plurality of predicted quantities.

5. A computer-implemented method comprising:
   receiving an indication of an item, a shipping option for the item, and a destination region to which the item can be shipped via the shipping option;
   identifying a feature of the item;
   generating machine readable input data representing the feature of the item, the shipping option, and the destination region;
   processing the machine readable input data with a machine learning (ML) model to generate a prediction regarding a quantity of the item that will be acquired in the destination region using the shipping option, wherein the ML model comprises an artificial neural network, and further wherein the artificial neural network is:
      generated from a plurality of training data sets, wherein each training data set comprises at least (i) a quantity of the item that was acquired within a period of time, (ii) a destination region the item was acquired in, and (iii) a shipping option used to acquire the item, and
      trained to associate, for each training data set, the quantity of the item that was acquired within the period of time, with (i) the destination region in which the item and (ii) the shipping option used to acquire the item;
   causing output of a user interface including information representing the prediction and a user-selectable option that enables creation of an offer for the item based at least in part on the destination region and the shipping option; and in response to an expiration of a duration of a time that is same as the period of time, determining a difference between the prediction and an actual quantity of the item acquired in the destination region using the shipping option within the period of time, and update the artificial neural network based at least in part on the difference.

6. The computer-implemented method of claim 5, further comprising configuring the user interface to include a first visual representation of historical quantity of the item that has been provided by a seller requesting the prediction, wherein the information representing the prediction includes a second visual representation of the quantity of the item that will be acquired in the destination region using the shipping option.

7. The computer-implemented method of claim 5, wherein the user interface includes a map with at least one selectable destination region, the computer-implemented method further comprising generating the machine readable input data based at least partly on user selection of the selectable destination region.

8. The computer-implemented method of claim 5, further comprising:
generating additional machine readable input data representing the feature of the item, the shipping option, and a different destination region;
processing the additional machine readable input data with the ML model to generate an additional prediction regarding a different quantity of the item that will be acquired in the different destination region using the shipping option; and
causing output of the information representing the prediction corresponding to the destination region based at least partly on determining that the quantity of the item that will be acquired in the destination region exceeds the different quantity of the item that will be acquired in the different destination region.

9. The computer-implemented method of claim 5, wherein the user interface includes a list with selectable shipping options, the computer-implemented method further comprising:
generating additional machine readable input data representing the feature of the item, a different shipping option, and the destination region;
processing the additional machine readable input data with the ML model to generate an additional prediction regarding a different quantity of the item that will be acquired in the destination region using the different shipping option; and
causing output of the information representing the prediction corresponding to the shipping option based at least partly on determining that the quantity of the item that will be acquired using the shipping option exceeds the different quantity of the item that will be acquired using the different shipping option.

10. The computer-implemented method of claim 5, further comprising:
generating additional machine readable input data representing the feature of the item and one or both of a different shipping option and a different destination region;
processing the additional machine readable input data with the ML model to generate an additional prediction regarding an additional quantity of the item that will be acquired based at least in part on the one or both of a different shipping option and a different destination region; and
causing output of a visual comparison between the prediction and the additional prediction.

11. The computer-implemented method of claim 5, further comprising:
identifying a feature of a seller requesting the prediction; and
generating the machine readable input data to additionally represent the feature of the seller.

12. A non-transitory computer-readable medium comprising computer-executable instructions that, when executed on a computing system, cause the computing system to perform operations comprising:
receiving an indication of an item, a shipping option for the item, and a destination region to which the item can be shipped;
generating a machine-readable representation of a feature of the item, the shipping option, and the destination region;
generating a prediction regarding a quantity of the item that will be acquired in the destination region using the shipping option by providing the machine-readable representation to a machine learning (ML) model comprising an artificial network, wherein the artificial network is:
generated from a plurality of training datasets, wherein each training data set comprises at least (i) a quantity of the item that was acquired within a period of time, (ii) a destination region the item was acquired in, and (iii) a shipping option used to acquire the item, and
trained to associate, for each training data set, the quantity of the item that was acquired within the period of time, with (i) the destination region in which the item and (ii) the shipping option used to acquire the item;
causing output of a user interface including information representing the prediction; and
in response to an expiration of a duration of time that is same as the period of time, determining a difference between the prediction and an actual quantity of the item acquired in the destination region using the shipping option within the period of time, and update the artificial neural network based at least in part on the difference.

13. The non-transitory computer-readable medium of claim 12, the operations further comprising configuring the user interface to include a user-selectable option to create an offer for the item, wherein terms of the offer for shipments to the destination region include the shipping option.

14. The non-transitory computer-readable medium of claim 12, the operations further comprising:
configuring the user interface to include a navigational link to an offer creation user interface; and
in response to user selection of the navigational link, outputting the offer creation user interface, wherein the offer creation user interface includes a user-selectable option to create an offer for the item based at least in part on the destination region and the shipping option.

15. The non-transitory computer-readable medium of claim 12, the operations further comprising configuring the user interface to include a first visual representation of historical quantity of the item that has been provided by a seller requesting the prediction, wherein the information representing the prediction includes a second visual representation of the quantity of the item that will sell to the destination region using the shipping option.

16. The non-transitory computer-readable medium of claim 12, wherein the user interface includes a map with at least one selectable destination region, the operations further comprising generating the machine-readable representation based at least partly on user selection of the selectable destination region.

17. The non-transitory computer-readable medium of claim 12, the operations further comprising:
   generating an additional machine-readable representation of the feature of the item, the shipping option, and a different destination region;
   generating an additional prediction regarding a different quantity of the item that will be acquired in the different destination region using the shipping option by providing the additional machine-readable representation to the ML model; and
   causing output of the information representing the prediction corresponding to the destination region based at least partly on determining that the quantity of the item that will be acquired in the destination region exceeds the different quantity of the item that will be acquired in the different destination region.

18. The non-transitory computer-readable medium of claim 12, the operations further comprising:
   generating an additional machine-readable representation of the feature of the item, a different shipping option, and the destination region;
   generating an additional prediction regarding a different quantity of the item that will be acquired in the destination region using the different shipping option by providing the additional machine-readable representation to the ML model; and
   causing output of the information representing the prediction corresponding to the shipping option based at least partly on determining that the quantity of the item that will be acquired using the shipping option exceeds the different quantity of the item that will be acquired using the different shipping option.

19. The non-transitory computer-readable medium of claim 12, the operations further comprising:
   generating an additional machine-readable representation of the feature of the item and one or both of a different shipping option and a different destination region;
   processing the additional input data with the ML model to generate an additional output representing an additional prediction regarding an additional quantity of the item that will be acquired based at least in part on the one or both of a different shipping option and a different destination region; and
   causing output of a visual comparison between the prediction and the additional prediction.

20. The non-transitory computer-readable medium of claim 12, the operations further comprising:
   identifying a feature of a seller requesting the prediction; and
   generating the machine-readable representation to additionally represent the feature of the seller.

* * * * *